United States Patent
Wang et al.

(10) Patent No.: US 12,447,893 B2
(45) Date of Patent: Oct. 21, 2025

(54) CHARGING SOCKET HAVING LIGHT GUIDE DEVICE

(71) Applicant: Changchun Jetty Automotive Technology Co., Ltd., Changchun (CN)

(72) Inventors: Chao Wang, Changchun (CN); Jing Zhang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 0 days.

(21) Appl. No.: 18/721,116

(22) PCT Filed: Dec. 14, 2022

(86) PCT No.: PCT/CN2022/138982
§ 371 (c)(1),
(2) Date: Jun. 17, 2024

(87) PCT Pub. No.: WO2023/116529
PCT Pub. Date: Jun. 29, 2023

(65) Prior Publication Data
US 2025/0058701 A1    Feb. 20, 2025

(30) Foreign Application Priority Data

Dec. 24, 2021 (CN) .......................... 202123288639.9

(51) Int. Cl.
*B60Q 1/26* (2006.01)
*B60L 53/16* (2019.01)
(Continued)

(52) U.S. Cl.
CPC ............ *B60Q 1/2661* (2013.01); *B60L 53/16* (2019.02); *B60Q 1/543* (2022.05); *G02B 6/0091* (2013.01)

(58) Field of Classification Search
CPC ....... B60Q 1/2661; B60Q 1/543; B60L 53/16; B60L 53/30; G02B 6/0091; Y02T 90/12
See application file for complete search history.

(56) References Cited

U.S. PATENT DOCUMENTS

| 2017/0253174 A1 | 9/2017 | Hook et al. |
| 2018/0334052 A1 | 11/2018 | Hwang et al. |
| 2021/0086650 A1 | 3/2021 | Wang et al. |

FOREIGN PATENT DOCUMENTS

| CN | 206098962 U | 4/2017 |
| CN | 206615096 U | 11/2017 |

(Continued)

OTHER PUBLICATIONS

CN 213124795 U Machine translation (Year: 2021).*

(Continued)

*Primary Examiner* — Elmito Breval
*Assistant Examiner* — Jose M Diaz
(74) *Attorney, Agent, or Firm* — LOZA & LOZA, LLP; Michael F. Fedrick

(57) ABSTRACT

The present disclosure discloses a charging socket having a light guide device, including: a charging socket housing including a charging socket front housing, an upper surface of the charging socket front housing being provided with a transparent panel; a light source provided in the charging socket housing; and the light guide device provided in the charging socket housing, the light guide device being attached to or close to the light source, attached to or close to the transparent panel, and guiding light of the light source to the transparent panel. The charging socket can improve the user experience and delight customers.

8 Claims, 1 Drawing Sheet

(51) Int. Cl.
*B60Q 1/50* (2006.01)
*F21V 8/00* (2006.01)

(56) References Cited

FOREIGN PATENT DOCUMENTS

| | | | |
|---|---|---|---|
| CN | 208170082 U | | 11/2018 |
| CN | 210687878 U | | 6/2020 |
| CN | 211641865 U | | 10/2020 |
| CN | 213124795 U | * | 5/2021 |
| CN | 214775409 U | | 11/2021 |
| CN | 216684108 U | | 6/2022 |
| DE | 102017126722 A1 | | 11/2018 |

OTHER PUBLICATIONS

International search report issued for counterpart Chinese Patent Application No. PCT/CN2022/138982 mailed on Feb. 22. 2023, 3 pages.
Extended European Search Report issued on Apr. 10, 2025 for counterpart European Patent Application No. 22909843.9, 9 pages.

* cited by examiner

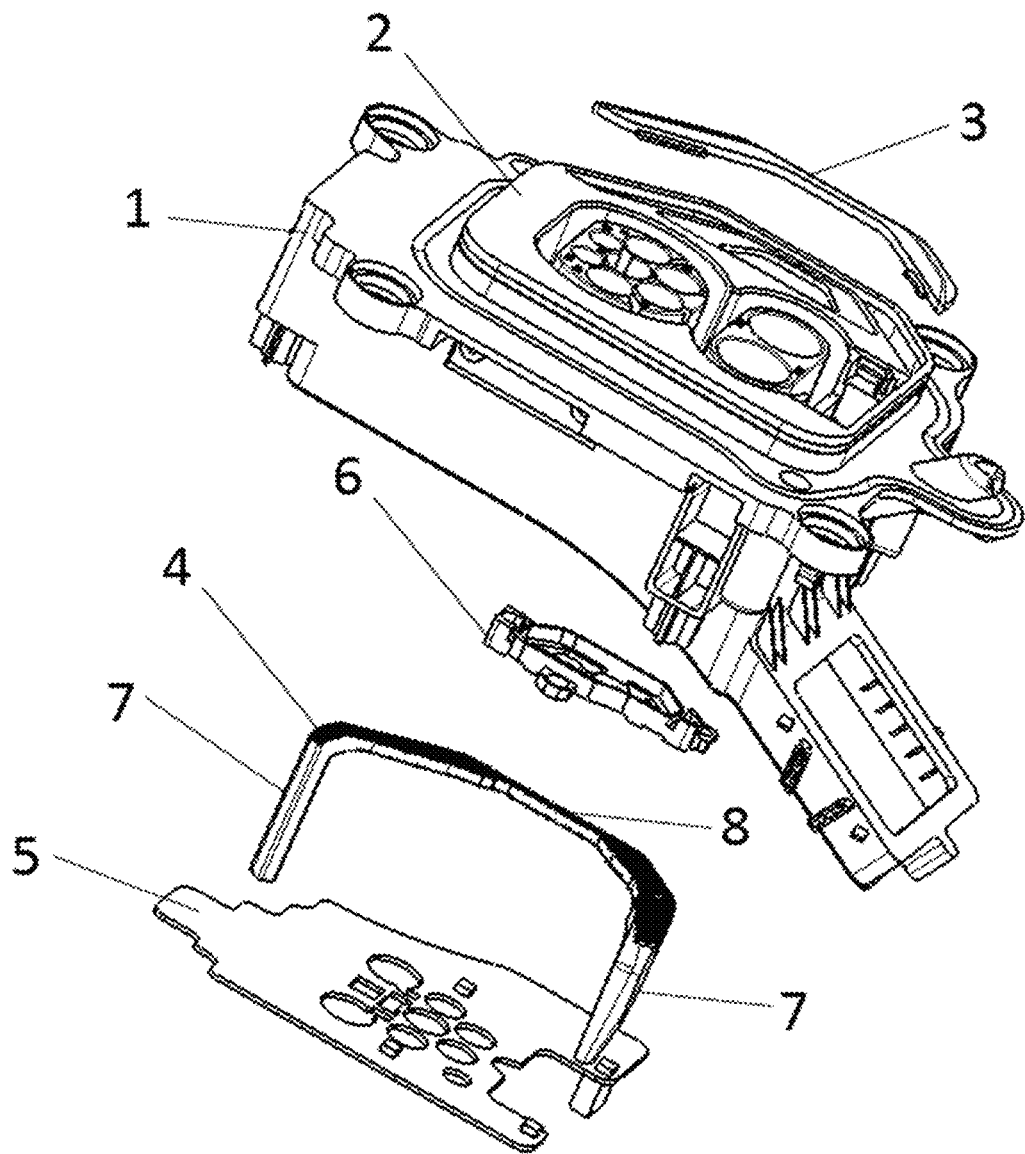

CHARGING SOCKET HAVING LIGHT GUIDE DEVICE

CROSS-REFERENCE TO RELATED APPLICATIONS

This application is the U.S. national stage of International Patent Application No. PCT/CN2022/138982, filed on Dec. 14, 2022, which claims priority to a Chinese Patent Application No. 202123288639.9, entitled "Charging socket having light guide device" and filed on Dec. 24, 2021, both of which are hereby incorporated by reference in their entireties.

TECHNICAL FIELD

The present disclosure relates to the technical field of automobile charging sockets, and particularly to a charging socket having a light guide device.

BACKGROUND

With the rapid development of society, the urban environment is getting worse. In order to protect our living environment, new energy automobiles, especially battery electric vehicles, are gradually popularized. As a power equipment matched with the electric automobile, the charging socket has been more and more used in people's lives. At present, the design of the charging socket in the market is too singular and not beautiful enough, and it is impossible to display the charging status of the electric automobile through the appearance of the charging socket, such that the user experience and the convenience cannot be improved. Moreover, in a dark environment at night, the light emitted by the lamp is too dazzling such that local blind areas appear in a user's vision, resulting in mis-operations and dangers.

SUMMARY

The present disclosure aims to provide a novel technical solution of a charging socket having a light guide device.

According to the present disclosure, there is provided a charging socket having a light guide device, including:
- a charging socket housing including a charging socket front housing, an upper surface of the charging socket front housing being provided with a transparent panel;
- a light source provided in the charging socket housing; and
- a light guide device provided in the charging socket housing, the light guide device being attached to or close to the light source, attached to or close to the transparent panel, and guiding light of the light source to the transparent panel.

Further, the transparent panel and the upper surface of the charging socket front housing are integrally formed using a double-shot injection molding.

Further, the charging socket front housing is made of a material containing plastic, the transparent panel is made of transparent plastic, and the transparent panel is capable of guiding the light inside the charging socket housing to the outside thereof.

Further, the light source includes a PCB (Printed Circuit Board) board mounted in the charging socket housing, and a status indicator lamp provided on the PCB board, and the status indicator lamp is electrically connected to a circuit on the PCB board.

Further, the status indicator lamp emits different colors of light, or there are a plurality of the status indicator lamps which emit different colors of light; and the PCB board includes a driving circuit that controls the status indicator lamp to turn on, turn off, or change color.

Further, the charging socket further includes a mounting bracket that is fixed on an inner surface of the charging socket front housing, and the PCB board is provided on a lower surface of the mounting bracket.

Further, the light guide device is provided between the charging socket front housing and the PCB board, and the light guide device is fixedly connected to the mounting bracket.

Further, the light guide device includes a light guide column and a light guide plate; the light guide plate is attached to or close to the transparent panel, two ends of the light guide plate extend downward to form the light guide column, and a tail end of the light guide column is attached to or close to the status indicator lamp; and the light guide column is fixedly mounted in grooves provided on both sides of the mounting bracket.

Further, there are a plurality of the light guide columns, which are capable of being attached to or close to a plurality of the status indicator lamps.

Further, the light guide column or the light guide plate is made of transparent plastic with a light transmittance greater than or equal to 80%.

The charging socket having the light guide device according to the present disclosure has the following advantageous effects:
1. In the charging socket having the light guide device according to the present disclosure, the light source is provided in the charging socket, so that the charging socket can present a beautiful appearance by setting the light source in different colors, so as to improve the user experience and delight customers.
2. The light source can be displayed in different ways, and the user can determine the charging status of the charging socket that charges a new energy automobile based on different display forms of the light source.
3. In the charging socket having the light guide device according to the present disclosure, the light transmitted through the transparent panel has an effect of lighting when the charging socket is in service.

Other characteristics and advantages of the present disclosure will be clearer from the following detailed description of the exemplary embodiments of the present disclosure made with reference to the drawings.

BRIEF DESCRIPTION OF THE DRAWINGS

The drawings, which are incorporated in and constitute a part of the specification, illustrate the embodiments of the present disclosure and explain the principles of the present disclosure together with the description.

FIG. 1 illustrates an explosion schematic diagram of a charging socket having a light guide device according to the present disclosure.

REFERENCE NUMERALS

1—charging socket housing, 2—charging socket front housing, 3—transparent panel, 4—light guide device, 5—PCB board, 6—mounting bracket, 7—light guide column, 8—light guide plate.

DESCRIPTION OF THE EMBODIMENTS

Various exemplary embodiments of the present disclosure will now be described in detail with reference to the drawings. It should be noted that the relative arrangements, the numerical expressions and the numerical values of components and steps set forth in these embodiments do not limit the scope of the present disclosure unless otherwise specified.

The following description of at least one exemplary embodiment is in fact merely illustrative and is in no way intended to limit the present disclosure and its application or use.

The techniques, methods and devices known to those skilled in the art may not be discussed in detail, but they should be regarded as part of the specification under appropriate circumstances.

In all examples illustrated and discussed here, any specific value should be interpreted as illustrative only and not as a limitation. Therefore, other examples of the exemplary embodiments may have different values.

A charging socket having a light guide device according to the present disclosure, as illustrated in FIG. 1, including:
 a charging socket housing 1 including a charging socket front housing 2, an upper surface of the charging socket front housing being provided with a transparent panel 3;
 a light source provided in the charging socket housing 1;
 a light guide device 4 provided in the charging socket housing 1, the light guide device being attached to or close to the light source, attached to or close to the transparent panel 3, and guiding light of the light source to the transparent panel 3.

During implementation, the light source is provided in the charging socket, so that the charging socket can present a beautiful appearance by setting the light source in different colors, so as to improve the user experience and delight customers. The light transmitted through the transparent panel has an effect of lighting when the charging socket is in service.

In an embodiment of the charging socket having the light guide device in the present disclosure, the transparent panel 3 and the upper surface of the charging socket front housing 2 are integrally formed using a double-shot injection molding.

During implementation, by integrally forming the transparent panel 3 and the charging socket front housing 2 using a double-shot injection molding, the sealing performance of the charging socket housing can be ensured.

Further, the charging socket front housing 2 is made of a material containing plastic, the transparent panel 3 is made of transparent plastic, and the transparent panel 3 can guide the light inside the charging socket housing 1 to the outside thereof.

During implementation, since the transparent panel 3 is made of transparent plastic, the transparent panel 3 and the charging socket front housing 2 may be integrally formed using a two-shot injection molding, so that a connection therebetween is firmer to ensure the sealing performance of the charging socket housing 1. Since the light emitted from the light source inside the charging socket housing 1 is transmitted through the transparent panel 3, the beauty of the charging socket housing 1 can be enhanced, and the user experience and favorability can be improved.

In an embodiment of the charging socket having the light guide device in the present disclosure, the light source includes a PCB board 5 mounted in the charging socket housing 1, and a status indicator lamp provided on the PCB board 5. The status indicator lamp is electrically connected to a circuit on the PCB board 5.

During implementation, by electrically connecting the light source to the circuit on the PCB board 5, the assembly procedure of the light source can be simplified, the service life of the light source can be prolonged, and the maintenance probability can be reduced.

Further, the status indicator lamp emits different colors of light, or there may be a plurality of the status indicator lamps which emit different colors of light; the PCB board includes a driving circuit that controls the status indicator lamp to turn on, turn off, or change color.

During implementation, the driving circuit controls the status indicator light to turn on, turn off or change color, so that the light source can be displayed in different ways, and the user can determine a charging status of the charging socket that charges a new energy automobile based on different display forms of the light source. For example, it may be set that a first color is displayed when the electric quantity of an energy storage device (i.e., a battery) is below 30%, a second color is displayed when the electric quantity of the energy storage device is from 31% to 60%, a third color is displayed when the electric quantity of the energy storage device is from 61% to 95%, and a fourth color is displayed when the electric quantity of the energy storage device is above 95%, so that the user can determine a working status of the charging socket and the electric quantity of the energy storage device in terms of the color, which is convenient, quick and practical.

Further, the charging socket further includes a mounting bracket 6 that is fixed on an inner surface of the charging socket front housing 2, and the PCB board 5 is provided on a lower surface of the mounting bracket 6.

During implementation, by fixing the mounting bracket 6 on the inner surface of the charging socket front housing 2 and providing the PCB board 5 on the mounting bracket 6, a stable connection between the PCB board 5 and the charging socket front housing 2 can be achieved, thereby ensuring that the connection between the components is firmer during the use of the charging socket, and preventing the occurrence of any device failure.

Further, the light guide device 4 is provided between the charging socket front housing 2 and the PCB board 5, and the light guide device 4 is fixedly connected to the mounting bracket 6.

During implementation, the connection between the light guide device 4 and the mounting bracket 6 is realized by ultrasonic welding, which can ensure that an upper part of the light guide device 4 is attached to or close to the transparent panel 3, and a lower part of the light guide device 4 is attached to or close to the light source. At this time, the light emitted from the light source may be refracted within the light guide device 4, and then refracted to the outside of the charging socket housing 1 through the transparent panel 3, so that the light of the light source can be seen by the user.

Further, the light guide device 4 includes a light guide column 7 and a light guide plate 8; the light guide plate 8 is attached to or close to the transparent panel 3, two ends of the light guide plate 8 extend downward to form the light guide column 7, and a tail end of the light guide column 7 is attached to or close to the status indicator lamp; and the light guide column 7 is fixedly mounted in grooves provided on both sides of the mounting bracket.

Further, there are a plurality of the light guide columns 7, which can be attached to or close to a plurality of the status indicator lamps.

During implementation, through the design of the light guide column 7 and the light guide plate 8, the material consumption of the light guide device 4 can be decreased, thereby reducing the production cost. By providing one end of the light guide column 7 to be attached to or close to a top or a sidewall of the status indicator lamp, the light emitted from the light source may be refracted within the light guide device 4 and then refracted to the outside of the charging socket housing 1 through the transparent panel, so that the light of the light source can be seen by the user.

Further, the light guide column 7 or the light guide plate 8 is made of transparent plastic with a light transmittance greater than or equal to 80%.

During implementation, by selecting the transparent plastic with a light conductivity greater than or equal to 80%, the light emitted from the light source can be transferred to the outside of the charging socket housing more effectively, thereby preventing the brightness of the transparent panel 3 from being too low and affecting the use effect for the user.

Although specific embodiments of the present disclosure have been described in detail by way of examples, those skilled in the art should appreciate that the above examples are only for illustration and are not intended to limit the scope of the present disclosure. It should be understood by those skilled in the art that the above embodiments can be modified without departing from the scope and spirit of the present disclosure. The scope of the present disclosure is defined by the appended claims.

The invention claimed is:

1. A charging socket having a light guide device, comprising:
   a charging socket housing comprising a charging socket front housing, wherein an upper surface of the charging socket front housing is provided with a transparent panel;
   a light source provided in the charging socket housing; and
   a light guide device provided in the charging socket housing, wherein the light guide device is attached to or close to the light source, attached to or close to the transparent panel, and guides light of the light source to the transparent panel,
   wherein the light source comprises a PCB board mounted in the charging socket housing and a status indicator lamp provided on the PCB board, the status indicator lamp being electrically connected to a circuit on the PCB board, and
   wherein the charging socket further comprises a mounting bracket that is fixed on an inner surface of the charging socket front housing and the PCB board is provided on a lower surface of the mounting bracket.

2. The charging socket having the light guide device according to claim 1, wherein the transparent panel and the upper surface of the charging socket front housing are integrally formed using a double-shot injection molding.

3. The charging socket having the light guide device according to claim 2, wherein the charging socket front housing is made of a material containing plastic, the transparent panel is made of transparent plastic, and the transparent panel is capable of guiding the light inside the charging socket housing to the outside thereof.

4. The charging socket having the light guide device according to claim 1, wherein the status indicator lamp emits different colors of light, or there are a plurality of the status indicator lamps which emit different colors of light; and the PCB board comprises a driving circuit that controls the status indicator lamp to turn on turn off, or change color.

5. The charging socket having the light guide device according to claim 1, wherein the light guide device is provided between the charging socket front housing and the PCB board, and the light guide device is fixedly connected to the mounting bracket.

6. The charging socket having the light guide device according to claim 1, wherein the light guide device comprises a light guide column and a light guide plate; the light guide plate is attached to or close to the transparent panel, two ends of the light guide plate extend downward to form the light guide column, and a tail end of the light guide column is attached to or close to the status indicator lamp; and the light guide column is fixedly mounted in grooves provided on both sides of the mounting bracket.

7. The charging socket having the light guide device according to claim 6, wherein there are a plurality of the light guide columns, which are capable of being attached to or placed close to a plurality of the status indicator lamps.

8. The charging socket having the light guide device according to claim 6, wherein the light guide column or the light guide plate is made of transparent plastic with a light transmittance greater than or equal to 80%.

\* \* \* \* \*